July 2, 1929.  L. E. WEST  1,719,095
DIFFERENTIAL LOCK
Filed May 22, 1928

INVENTOR.
LOREN E. WEST.
BY
ATTORNEY.

Patented July 2, 1929.

1,719,095

UNITED STATES PATENT OFFICE.

LOREN E. WEST, OF LONG BEACH, CALIFORNIA.

DIFFERENTIAL LOCK.

Application filed May 22, 1928. Serial No. 279,668.

This invention relates to a locking means for the differential gears of motor vehicles.

An object of my invention is to provide a simple and effective means for locking the differential gears so that both rear wheels will be positively rotated by the engine.

Another object is to provide a differential lock which comprises a relatively few number of parts and which can be easily and quickly actuated by the operator.

Other objects, advantages, and features of invention may appear from the accompanying drawing, the subjoined detailed description, and the appended claims.

Figure 1:
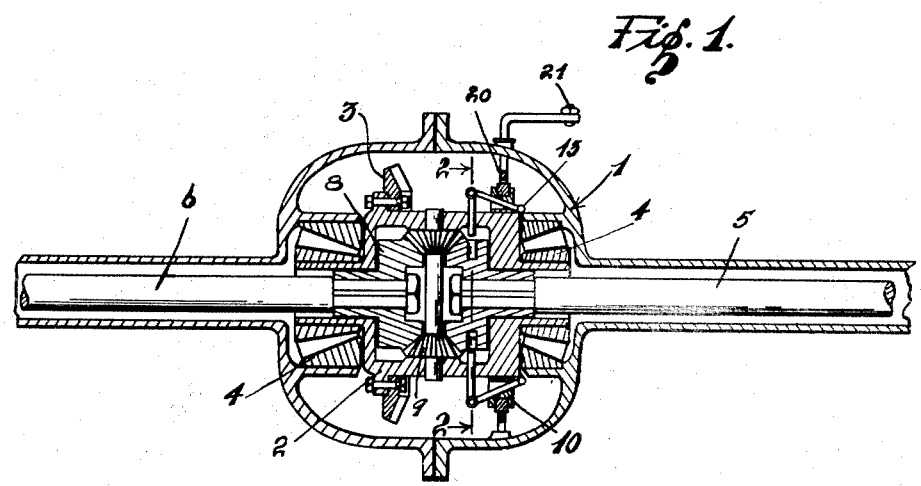
Fig. 1 is a transverse sectional view of a differential including my locking means therefor.
Figure 2:
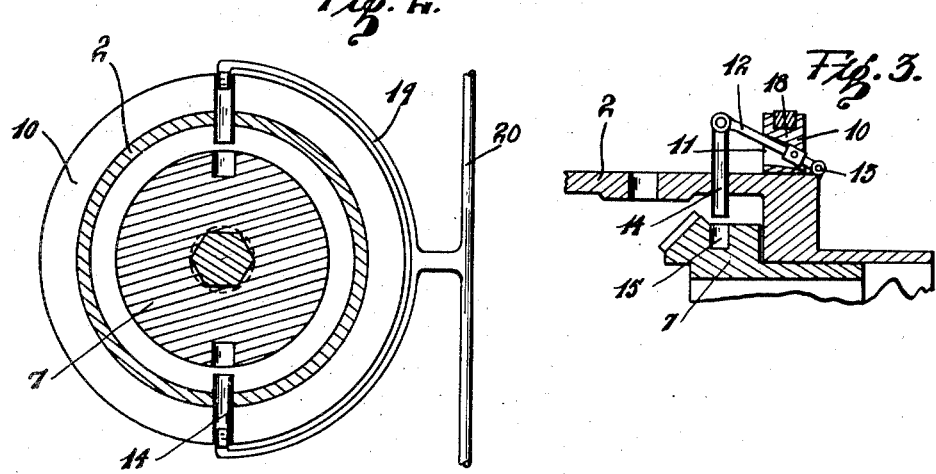
Fig. 2 is an enlarged sectional view taken on line 2, 2 of Fig. 1.
Figure 3:
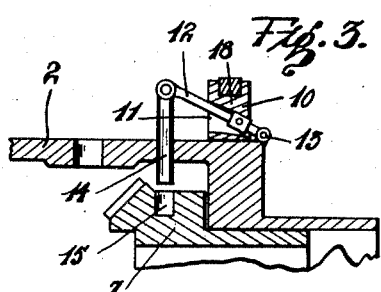
Fig. 3 is a fragmentary sectional view of the locking arrangement.
Figure 4:
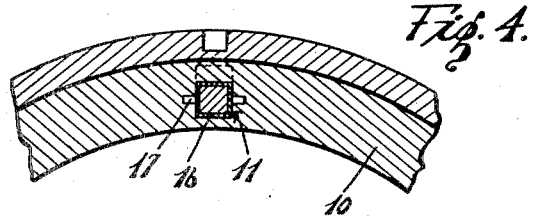
Fig. 4 is a fragmentary sectional view of the pin actuating ring.

Referring more particularly to the drawing; the numeral 1 indicates the usual differential housing which is of well-known construction, and this housing encloses a cage 2 to which the ring gear 3 is secured. The ring gear is constantly rotated by the engine through the usual pinion gear (not shown). This construction being usual and well-known forms no part of my invention. The cage is journaled in the housing on suitable bearings 4, said bearings being of any desirable construction.

The rear axles 5, 6 extend into the housing 1 and differential gears 7, 8 are secured to the inner end thereof, respectively. A plurality of bevel gears 9 are journaled on the cage 2 and mesh with both differential gears 7, 8, whereby the axles 5, 6 are rotated. It will be evident that if either of the differential gears 7, 8 are fixed to the cage 2 then there will be a positive drive from the engine through the ring gear 3 and thence to the axles 5, 6.

I accomplish this locking means in the following manner:

A ring 10 is slidably mounted on the cage 2 and this ring is provided with a plurality of slots 11 extending transversally therethrough. For each of the slots 11 I provide a link 12 which extends through the slots, and the outer end of the link is pivotally secured to the cage 2, as at 13. A pin 14 is pivotally mounted on the inner end of the link 12 and this pin extends through the cage 2.

A plurality of recesses 15 are provided in the differential gear 7 into which the pins 14 are adapted to extend. When the pins are resting in the recesses 15 the cage and differential gear are locked together and there is no differential action between the gears and the bevel gears 9. In order that the links 12 shall be positively raised or lowered as the ring 10 is moved back and forth, I provide a sleeve 16 through which the link 12 slides. Trunnions 17, 17 extend outwardly from the sides of the sleeve into the ring, thus pivotally mounting the sleeve to the ring.

A band 18 fits into a groove in the ring 10 and this band is engaged by a yoke 19 which is secured to a rod 20 which extends upwardly through the housing 1. The rod 20 is rotated by the operator through suitable links 21, or the like, and this swings the yoke 19 and moves the ring 10 backwardly or forwardly to raise and lower the pins 14, thus locking the differential gear as desired by the operator.

Having described my invention, I claim:

1. In combination with a differential gear mechanism including a cage, differential gears, and gears journaled in the cage meshing with the differential gear, a locking means comprising a pin extending through said cage, said differential gear having recesses therein to receive said pins, and means to depress said pins into the recesses thereby locking the cage to the differential gear, said means comprising a ring encircling the cage, a link extending through said ring, said link being secured to said pin, and means to slide said ring along the link whereby the pin is depressed into the recesses.

2. In combination with a differential gear mechanism including a cage, differential gears, and gears journaled in the cage meshing with the differential gear, a locking means comprising a pin extending through said cage, said differential gear having recesses therein to receive said pins, a ring encircling said cage and slidable thereon, said ring having slots cut therein, a link pivoted to the cage and extending through said slot, the inner end of said link being pivotally secured to the pin, and means to slide said ring over the cage thereby depressing the link and extending the pin into the recesses.

3. In combination with a differential gear mechanism including a cage, differential gears, and gears journaled in the cage meshing with the differential gear, a locking means comprising a pin extending through said cage, said differential gear having recesses therein to receive said pins, a ring encircling said cage and slidable thereon, said ring having a slot formed therein, a sleeve journaled in the slot, a link pivotally mounted at one end to the cage, said link being slidably mounted in the sleeve, and the other end of said link being pivotally secured to the pin, and means to slide said ring along the cage to depress the said link and pin.

In testimony whereof, I affix my signature.

LOREN E. WEST.